INVENTOR.
Malcolm D. Clark

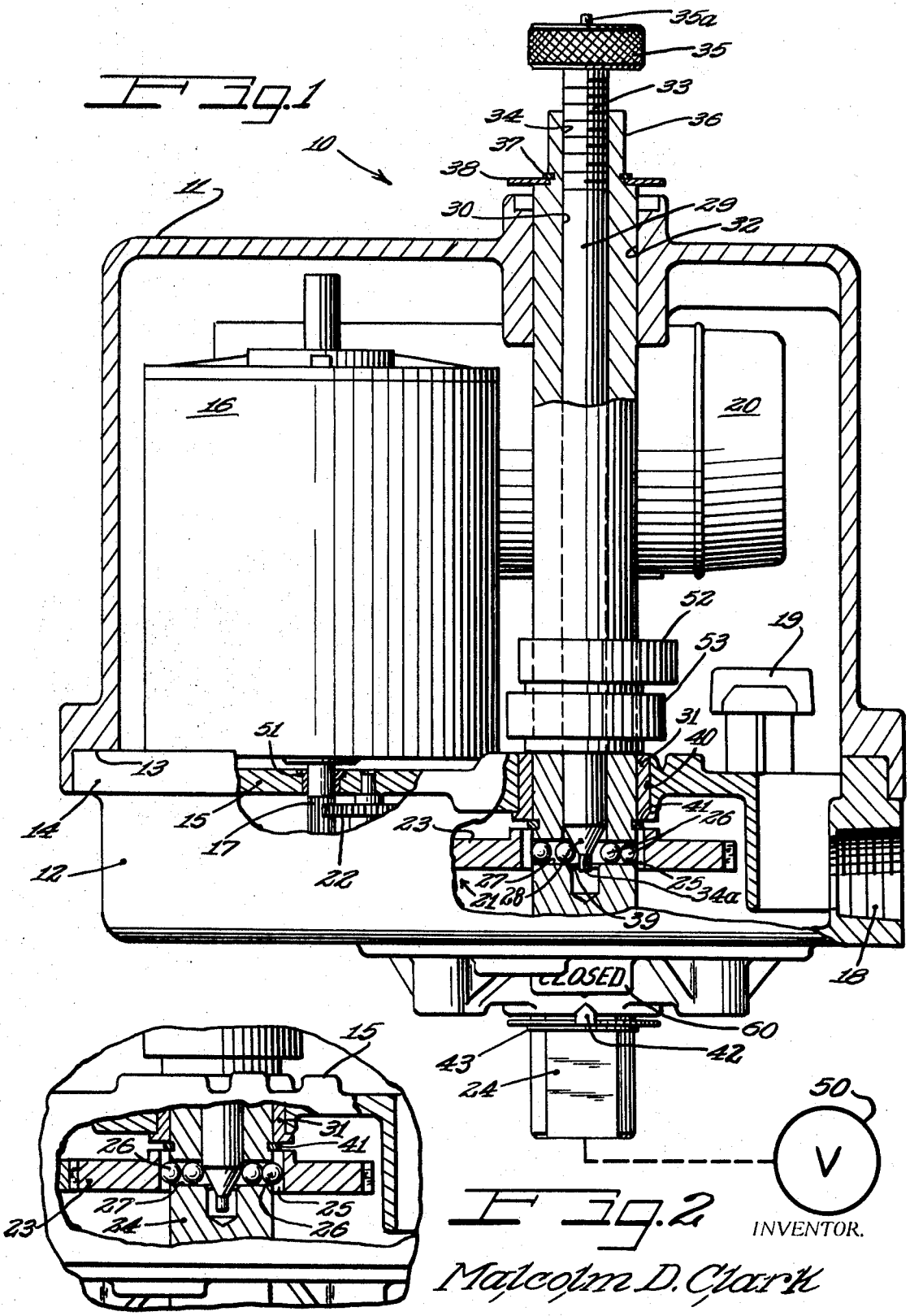

INVENTOR.
Malcolm D. Clark
ATTORNEYS

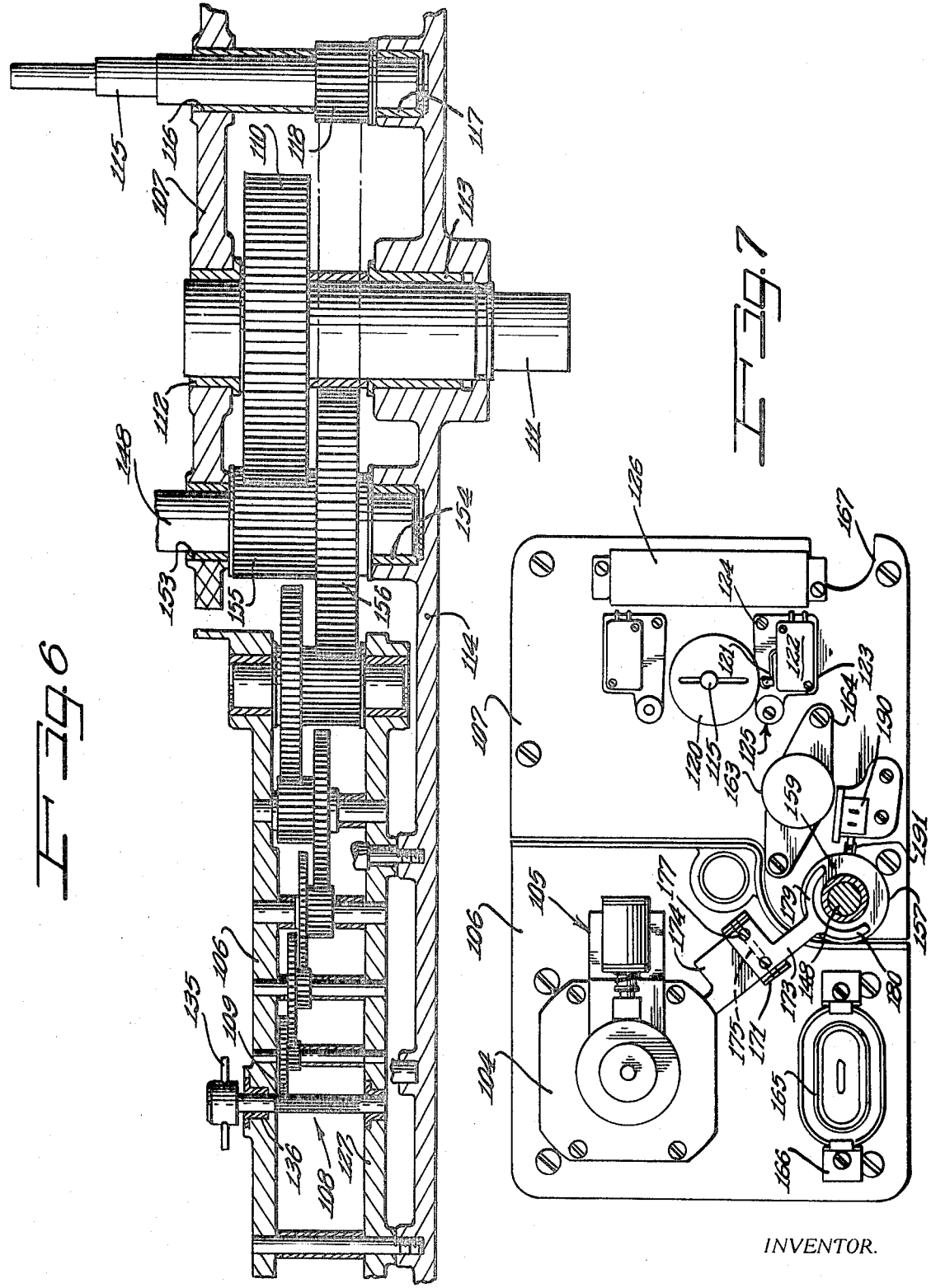

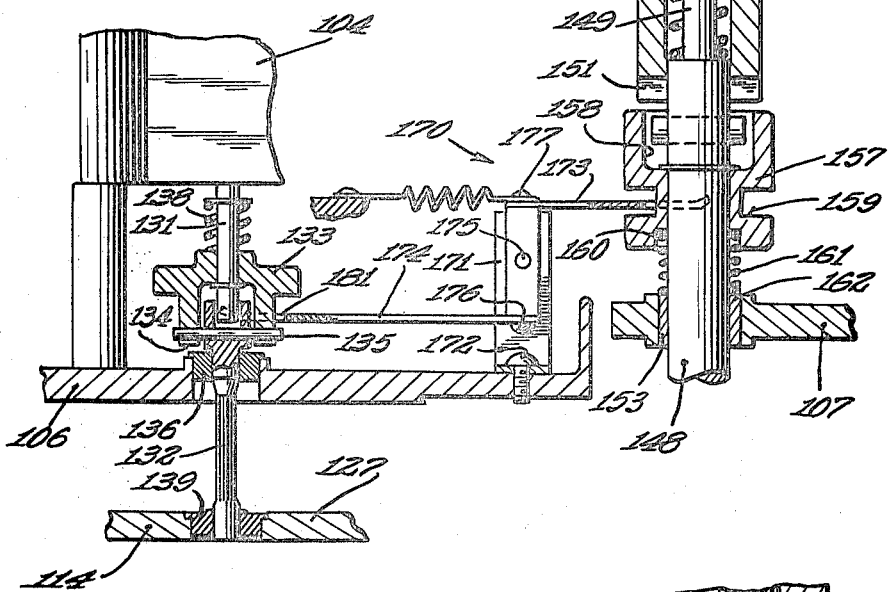
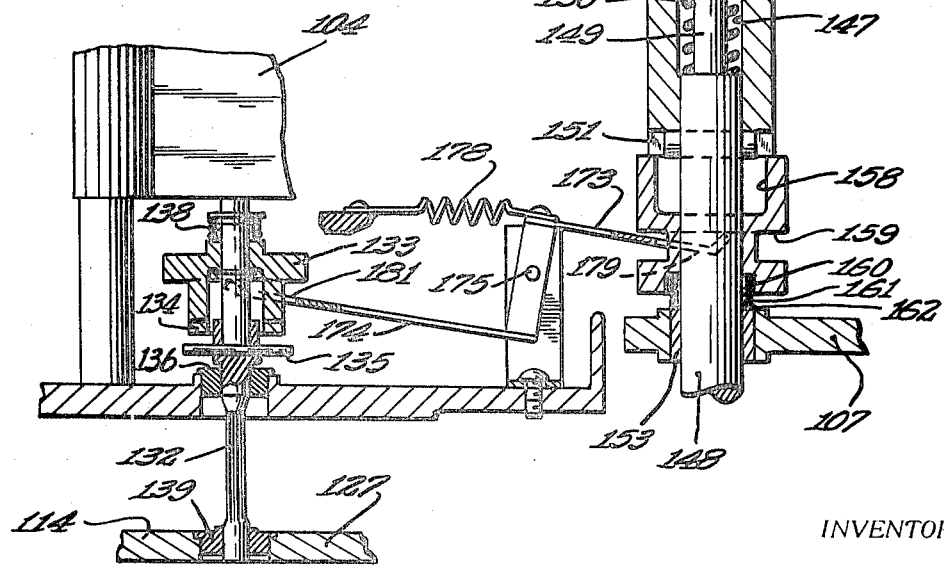

United States Patent Office 3,572,163
Patented Mar. 23, 1971

3,572,163
SELECTIVE ACTUATING MEANS FOR OPERATING A VALVE MANUALLY OR BY MOTOR
Malcolm D. Clark, Glasgow, Scotland, assignor to Raymond Control Systems Inc.
Filed Apr. 3, 1969, Ser. No. 813,119
Int. Cl. F16h 35/00; F16d 19/00
U.S. Cl. 74—625
10 Claims

ABSTRACT OF THE DISCLOSURE

Valve actuating apparatus which is normally operated by motor may be operated manually by disengaging the output of the motor from the valve and engaging the valve with a manually rotatable shaft. One embodiment of the invention utilizes a gear having a splined hub and a plurality of spheres which are positionable into and out of the splined hub to effect mechanical coupling between the motor and the associated valve, while a second embodiment employs a lever arrangement for axial displacement of the driving pinion of the motor from the gear train driven thereby to effect disengagement of the motor, the lever arrangement being actuated by linear displacement of a manually rotatable shaft which is also employed for manual operation of the valve.

BACKGROUND OF THE INVENTION

Field of the invention

This invention relates to apparatus for actuating valves, and more particularly to valve actuating apparatus which may be operated either manually or by motor.

Description of the prior art

Manual operation of a valve is, of course, well known in the art. It is also generally known to provide valve actuating apparatus which is electrically powered to position a rotatable stem of the valve controlled thereby between its open and closed conditions. For example, in the area of ball valves wherein a control ball is disposed between two valve seats and rotated through one-quarter turn to position a centrally located bore into or out of alignment with the valve seats, rotation of the flow control ball is provided by means of an electrically-operated motor through the intermediary of a gear train. In order to manually modify the condition of a motor-driven valve, one may rotate the valve stem, that is if the valve stem is readily accessible. Manual rotation of the motor and gear train may also be affected; however, valve actuators of the prior art are generally constructed in a manner such that manual operation of the driving apparatus is difficult to attain. An alternative would, of course, reside in the partial or complete dismantling of the actuator from the valve assembly. It is therefore highly desirable, and a primary object of the present invention, to provide a motor-driven valve actuator which includes means for manually operating the valve, and to provide the manual operating means in a readily accessible location on the valve actuator structure.

SUMMARY OF THE INVENTION

Briefly then, and according to the present invention, there is provided valve actuating apparatus including an electrically operated motor and a gear train coupled between the motor and the rotatable stem of a valve. The motor and gear train are housed in a casing. Means are provided for manually operating the valve, the manual operating means extending through the casing and effecting disengagement between the motor and the valve assembly.

BRIEF DESCRIPTION OF THE DRAWINGS

The above and other objects and features of the invention, its organization, construction and operation, will be best understood from the following detailed description taken in conjunction with the accompanying drawings, in which:

FIG. 1 is an elevational view, shown partially in cross-section, of a valve actuator according to the present invention;

FIG. 2 is an elevational view of a portion of FIG. 1, shown partially in cross-section, illustrating different positions of the elements thereof as the motor is engaged in driving relationship with the output shaft of the actuator;

FIG. 6 is a developed view of the gear train of the valve actuator of FIG. 5 shown in cross-section;

FIG. 7 is a top plan view of the apparatus for mounting the electrical components of the actuator of FIG. 5, and further illustrates the modular concept of the actuator of this embodiment; and FIGS. 8 and 9 are similar fragmentary views, shown partially in cross-section, of the valve actuator of FIG. 5 particularly illustrating the engagement and disengagement of the motor and the hand wheel with respect to the gear train and the output shaft.

DESCRIPTION OF THE PREFERRED EMBODIMENTS

Inasmuch as each of the embodiments of the present invention illustrated herein are directed to similar control functions, for example controlling powered ball valves, but are designed for somewhat different applications, each will be considered to have its output shaft (24, 111) conected to a rotatable stem of a ball valve assembly 50 and each will be separately described. It will be appreciated that a powered ball valve is only employed herein for purpose of illustration and is not the only type of controlled apparatus with which the invention may be employed. For example the linkage between the output shaft of the actuator and the controlled device may provide linear reciprocal movement for operating a plunger or a lever. Also, an intermediate power conversion device such as a torque converter or a gear train may be employed as required. For clarity and ease of understanding, however, a simple rotatable valve stem is employed in the following description.

Figure 3:
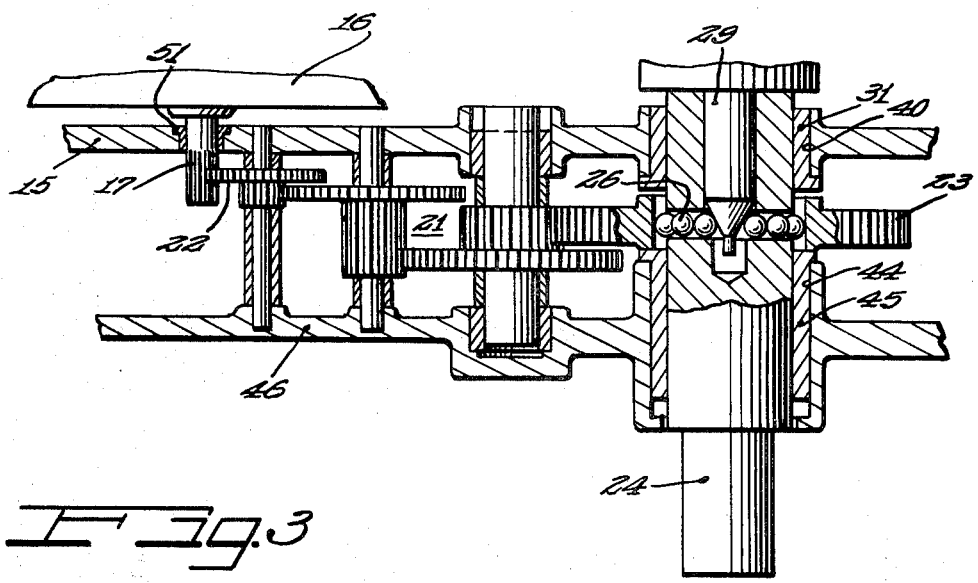
FIG. 3 is a fragmentary sectional view illustrating the gear train of the actuator of FIG. 1.
Figure 4:
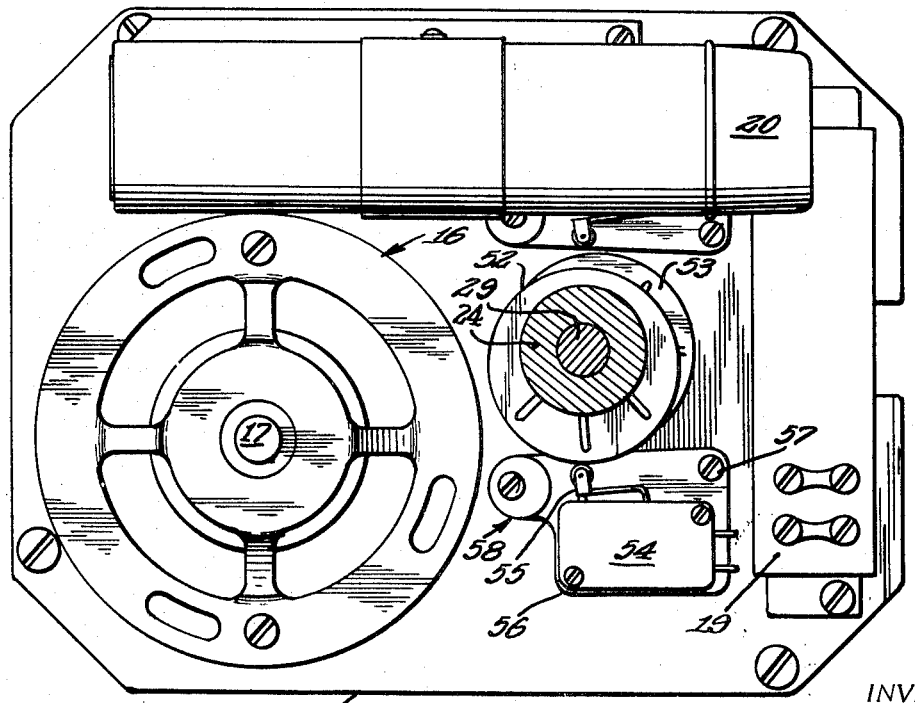
FIG. 4 is a top plan view of the apparatus for mounting the motor and other electrical elements of the valve actuator illustrated in FIG. 1.

Embodiment of FIGS. 1-4

In the drawings a valve actuator is generally shown at 10 as comprising an upper casing 11 and a lower casing 12 which are mated by means of the annular groove 13 in casing 11 receiving the annular ridge 14 in casing 12. Disposed generally at the same level as elements 13 and 14 is a mounting plate 15 for carrying the various electrical components of the actuator and for aiding in journalling the gear train 21. Mounted on plate 15 is a driving motor 16 having a splined output shaft 17 which extends through bearing 51.

A threaded inlet passageway 18 is provided for extending electrical wiring to terminal block 19. From terminal block 19 the required wiring may be extended to motor 16, switches 54 and other electrical components 20 which control the motor 16 for electrically powered displacement of the control ball of the valve assembly 50. A gear train 21 including gear 22 engaged with the splined shaft 17 and gear 23 which may be coupled to output shaft 24 is journalled between plate 15 and plate 46, the bottom portion of lower casing 12.

The output shaft 24 includes a transverse bore 27 therethrough which carries movable spheres 26 for transverse displacement into and out of spline slots 25 in the central hub bore of gear 23. Motor 16 is therefore engaged with output shaft 24 when the outermost spheres 26 of the transverse bore 27 are disposed in both the transverse slot 27 and the spline slots 25 of gear 23. Output shaft 24 includes a central bore 30 which extends from its upper end and which carries a shaft 29 for movement axially thereof. Shaft 29 includes a conical shaft portion 28 disposed at the lower end thereof for vertical travel through bore 27, the conical portion 28 being effective upon downward movement thereof to force spheres 26 radially outward through bore 27 whereupon the outermost ones of the balls extend into the spline slots 25.

The central bore 30 includes a formed end 39 which conforms to the shape of shaft portion 28. To move shaft 29 downwardly (or upwardly), the shaft is provided with a knurled knob 35 and a threaded portion 33 which engages a threaded portion 34 of the central bore 30.

Shaft 33 includes a central bore 34a which receives shaft 35a. Shaft 35a includes at least two diameters, the smaller of which is located at its lower end for establishing a sliding relation to bore 34a so that as shaft 35a strikes the bottom of bore 30 more of the top end of shaft 35a is visible when the shaft 33 is moved downwardly to provide a visual indication as to whether the actuator is engaged for motor operation.

Wrench flats 36 are provided for receiving a tool for manually turning the output shaft 24 upon disengagement of shaft 24 from gear 23. Shaft 24 is rotatable in bearing 31 which is seated in aperture 40 of plate 15. Retaining ring 41 and a lip on the underside of bushing 31 prevent upward axial movement of shaft 24. Retaining ring 41 also provides an indexed spacing between bearing 31 and gear 23.

On the bottom exterior of the valve actuator, a pointer 42 is integral with a ring disposed on output shaft 24 and held in place by retaining ring 43. Pointer 42 is directed toward indicia 60 spaced 90° about the rotatable output shaft 24 of the actuator to indicate that the associated valve 50 is in an open or a closed condition. The same indications (only partially illustrated) are provided at the upper exterior of the actuator by elements 37 and 38.

An electrical indication of the position of the valve 59 is provided and the operation of motor 16 is controlled by a pair of cams 52 and 53 which are carried on shaft 24 for mutual rotation therewith. Disposed adjacent each of the cams 52 and 53 are respective switches 54 having switch actuators 55 which operate the respective switches in accordance with the angular position of shaft 24 as related to the switches by cams 52 and 53. Each of the switches 54 is provided with a mounting bracket 56 which is pivotally attached to plate 15 by screw 57. A camming structure 58 is releasably secured to plate 15 and is movable to position the respective switch relative the associated cam 52 or 53, so that the electrical condition of motor 16 corresponds to the physical condition of the associated valve 50. Switches 54 may therefore be employed to accurately de-energize the winding of motor 16 (or transfer the energizing polarity thereof) as valve 50 reaches its fully open or fully closed condition.

Figure 5:
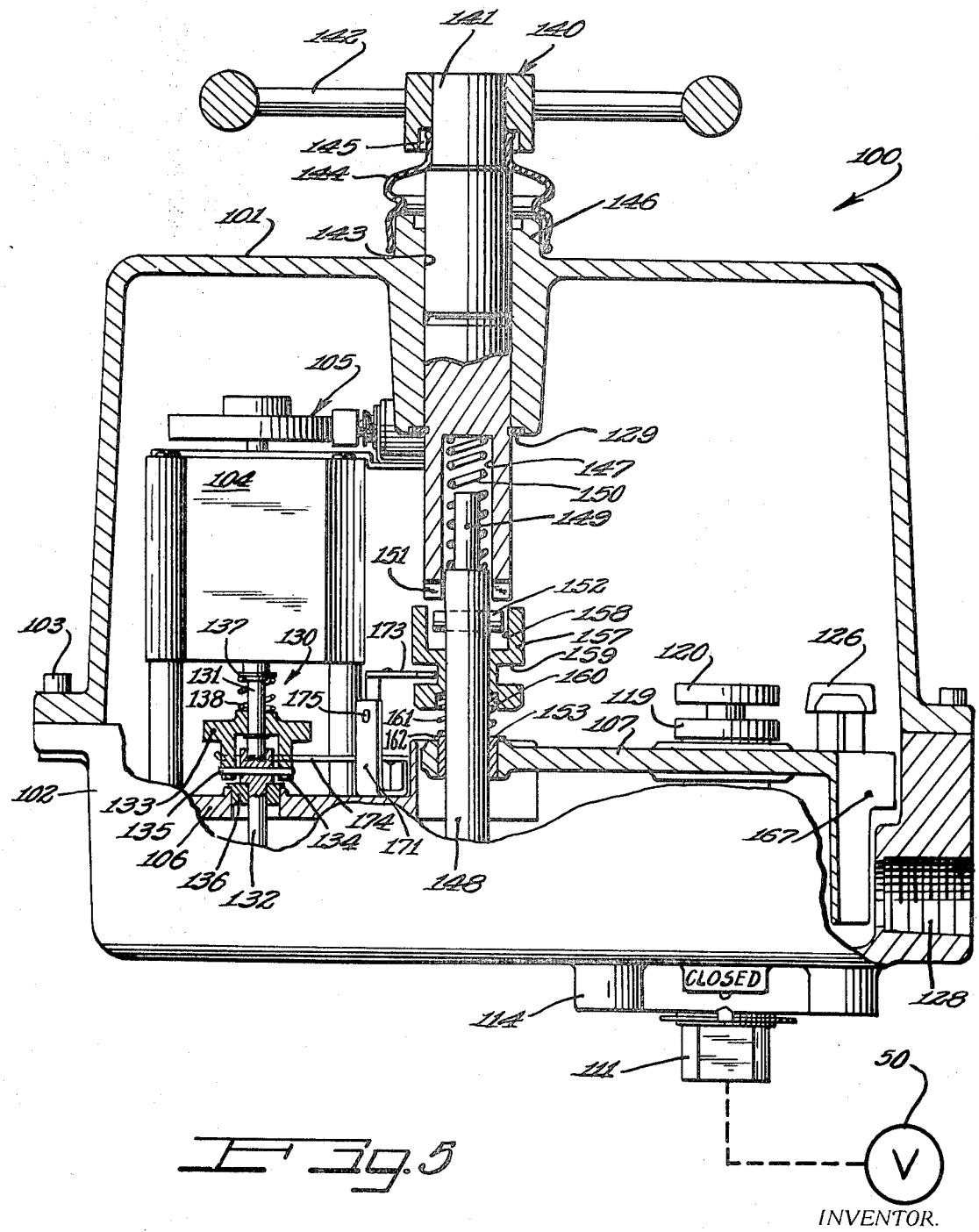
FIG. 5 is an elevational view, shown partially in cross-section, of another embodiment of the invention.

Embodiment of FIGS. 5–9

In these drawings there is generally shown at 100 a valve actuator which may be employed in applications which require more operating power, than applications for the valve actuator 10 of the foregoing embodiment. Actuator 100 comprises an upper casing 101 and a lower casing 102 which are joined together by machine screws 103 through mating edges thereof.

The actuator 100 further comprises a driving motor 104 having an electromagnetic braking mechanism 105 coupled thereto. Motor 104 and other actuator elements are carried on a plate 106 which is disposed below the mating edges of casings 101 and 102. Another plate 107 is disposed at substantially the height of the mated edges 101 and 102 and serves as an aid to journalling shafts and for carrying some of the electrical components of the actuator.

Motor 104 includes an output shaft 131 which is generally coupled through a first input shaft 132 of a gear train 108 to the output shaft 111 for electrically driving the valve 50 between its open and closed conditions. Output shaft 111 is journalled in plates 107 and 114 by means of bearings 112 and 113, respectively, and carries gear 110 of gear train 108.

In the foregoing embodiment, electrical indication of the condition of the valve was derived from cams carried by the output shaft. By way of contrast, but in a similar manner, the present embodiment includes a shaft 115 which is journalled between plates 107 and 114 by bearings 116 and 117, respectively, and which is driven by gear 118 of gear train 108. Shaft 115 carries cams 119 and 120 which are slidably engaged by switch operating arms 121 to control the electrical condition of the motor circuit and its associated components with respect to the angular position of the power ball of the valve assembly 50. As in the previous embodiment, switch 122 is pivotally carried above the surface of 107 by mounting bracket 123 and machine screw 124, the mounting bracket 123 being adjusted about pivot 124 by camming means 125 which is releasably engaged to plate 107. Spaced-apart indicia are also provided on the lower exterior of casing 102 for visual observation of the condition of the valve 50 as were provided in the foregoing embodiment.

The motor 104 is mechanically disengaged from the output shaft 111 and a handle 142 is engaged with output shaft 111 for manual operation of the valve 50. Normally motor 104 is engaged with the gear train 108 and output shaft 111 by means of a drive pinion coupling arrangement 130. This coupling arrangement 130 comprises motor output shaft 131 which is to be coupled for rotation of aligned shaft 132 which in turn is meshed to gear 109 of gear train 108. Shaft 131 carries in mutual rotation therewith an annular clutch collar 133 having an annular portion depending therefrom forming slots 134 at the lower end thereof. Shaft 132 carries a transverse pin 135 at its upper end for engagement in the slots 134 as a spring 138 urges the clutch collar 133 downwardly and away from retaining ring 137. Shaft 132 is rotatably carried by bearing 136 in plate 106, and being so coupled to shaft 131, is rotatably driven thereby to in turn drive gear train 108.

Manually operable apparatus 140 is provided for controlling the engagement between output shaft 131 of motor 104 and shaft 132. Apparatus 140 comprises a shaft 141 having a wheel-type handle 142 secured to its upper end. Shaft 141 is disposed in bore 143 of upper casing 101. A flexible boot 144 has one end thereof secured in an annular groove formed by shaft 141 and a cutout in the hub of wheel 142, and the other end stretched over an upwardly extending portion 146 of casing 101. The boot 144 therefore seals bore 143 from receiving foreign matter. The lower end of bore 143 is sealed from receiving foreign matter by sealing ring 129 carried by shaft 141.

Shaft 141 includes an axial bore in its lower end for receiving a shaft 148 having a portion 149 of a smaller diameter, which in turn is received by a spring 150. Spring 150 bears against the end of bore 147 and the stepped portion of shaft 148 to urge shaft 141 toward its uppermost position. Shaft 141 includes end means forming slots 151 diametrically thereacross to receive a transverse pin 152 of an aligned shaft 148 when handle 142 is forced downwardly against the action of spring 150 to manually engage the handle 142 with the shaft 148. Attention is invited that shaft 148 is journalled in plates 107 and 114 by means of bearings 153 and 154 and carries gears 155 and 156 between these plates as part of gear train 108. Handle 142 may therefore be employed to manually position the ball of valve 50 via the gear train. However, the just-described engagement between handle 142 and output shaft 111 has not covered disengagement of motor 104 from output shaft 111. Such disengagement is extremely advantageous in that for applications which require a great deal of torque output at shaft 111, the gear train and torque experienced back through the driving motor 104 and brake 105 is extremely high and should be eliminated for ease of operational handle 142; therefore, means are provided for disengaging motor 104 from the gear train 108.

Shaft 148 carries a cup-shaped element 157 having a cup 158 surrounding transverse pin 152 and which is disposed in an interference relationship with the lower end of shaft 141 as handle 142 is moved downwardly against a restoring bias. A groove formed by shaft 148 and a cutout 160 in element 157 seats one end of spring 161, the other end of spring 161 bearing against a washer 162 carried over bearing 153. Spring 161 provides the restoring bias by urging element 157 upwardly against the lower end of shaft 141.

Element 157 further includes an annular groove 159 therein which, of course, moves downwardly with the element upon manual interfering engagement between shaft 141 and shaft 148. A lever assembly 170 (see particularly FIGS. 8 and 9) is carried on and secured to plate 106 and is effective to disengage the output shaft 131 of motor 104 from shaft 132 upon downward movement of element 157. The lever arm arrangement 170 includes a mounting bracket 171 which is secured to plate 106 by means of machine screws 172. A first lever arm 173 extends toward shaft 148 and includes end portions 179 and 180 which straddle shaft 148 within groove 159 of element 157. A second lever arm 174 is similar to lever arm 173 and extends toward the output shaft 131 of motor 104 and includes a similar pair of ends 181 and 182 which straddle shaft 131 and extend below the annular clutch collar 133. A restoring spring 178 (and lever arm 173) is secured to the lever arrangement by machine screw 177 and provides a restoring force for the lever arm arrangement. Lever arm 174 is secured to the lever arm arrangement by means of machine screw 176. The arrangement pivots about pin 175 as the clutch collar 157 moves up and down on shaft 148. As element 157 moves downwardly, lever arm 173 moves downwardly and lever arm 174 moves upwardly raising clutch collar 133 and disengaging slots 134 from pin 135. With handle 142 in the downward position, the actuator is engaged for manual operation of the valve 50 and disengaged for motor operation of motor 104.

An electrical switch 190 having a switch operator 191 disposed in groove 159 of element 157 electrically disengages the motor 104 from its powering circuit as element 157 moves downwardly so that an unsafe condition may not exist if motor 104 should be inadvertently energized while engagement between the gear train and motor 104 was being transferred to manual control by handle 142.

Caps 163 and 165 are provided to cover the upper bearings of the gear train and are secured to the plates 107 and 106, respectively, by machine screws 164 and latching apparatus 166.

Actuator 100 is provided with a threaded electrical conduit connection 128, a passageway 167 for wiring and a terminal block 126 for distribution of wiring to the various electrical components of the actuator in a manner similar to the embodiment of FIGS. 1-4.

Inasmuch as a valve actuator of the type just-described may be employed for a variety of fluid control applications wherein the controlled valves may require different operating power and torques, the present invention is also concerned with the utilization of a single universal housing and mounting arrangement in a modular form wtherein apparatus having different operating specifications may be supplied as modular units for a universal housing structure. In this regard, attention is invited to the provision of separate mounting plates 106 and 107. Plate 106 carries primarily motor 104, the lever arm arrangement 170, and journalling apparatus for the motor associated portion of the gear train 108. With the construction disclosed herein, the portion of the gear train associated with plate 106 and the motor 104 may be replaced by a similar arrangement of different specifications by removing housing 101 and the manual operating means 140 from the valve actuator, disconnecting the lever arm arrangement 170 from element 157, removing plate 106 and its associated components, and then reversing the procedure adding a new plate 106 and associated components of different operating specifications. With such a modular concept it is not necessary to manufacture a complete line of valve actuators of this particular type for all power ratings, but to provide a universal structure with the motor associated driving components being supplied on a modular basis. Also field maintenance and/or changing of the powering elements associated with plate 106 is greatly enhanced by the modular construction of the valve actuator.

Although minor modifications might be suggested by those versed in the art, it should be understood that I wish to embody within the scope of the patent warranted hereon all such modifications as reasonably and properly come within the scope of my contribution to the art as defined in the appended claims.

The embodiments of the invention in which an exclusive property or privilege is claimed are defined as follows:

1. Actuator apparatus comprising:
   a driving unit including a motor having a rotatable output member, and a control circuit for connection to a source of energy;
   a rotatable output shaft including a first end for connection to apparatus to be controlled by the actuator, a second end having means adapted to receive a tool for manual rotation of said output shaft, an axial bore, and a transverse bore communicating with said axial bore;
   gear means for coupling the rotatable output member of said motor to said output shaft including a gear having wall means defining an axial bore with spline grooves parallel to the axis of said gear communicating with the axial bore thereof, said output shaft extending through said axial bore of said gear with said transverse bore in communication with said axial bore of said gear; and
   clutch means for releasably engaging said gear and said output shaft in driving relationship, said clutch means including a plurality of spheres disposed in said transverse bore for movement axially thereof, and a clutch shaft disposed in said axial bore of said output shaft for movement axially thereof between first and second positions, said clutch shaft including threaded means for releasably latching said clutch shaft in said second position and means for indicating the position of said clutch shaft, and formed means being in an interfering relationship with said spheres as said shaft moves toward said second position to urge said spheres outwardly of the axis of said output shaft and the outermost spheres into a keying engagement of said transverse bore and said spline grooves of said gear, whereupon said output shaft may be rotated by said driving unit.

2. The valve actuating apparatus defined in claim 1, wherein said clutch means further comprises a clutch shaft, a second clutch collar slidably carried on said clutch shaft, means including said manually operable means for sliding said second clutch collar on said clutch shaft, and means coupled between said clutch collars for translating movement of said second clutch collar into movement of the first-mentioned clutch collar to engage and disengage said pin and said groove.

3. Actuator apparatus comprising:
   a rotatable output shaft for connection to apparatus to be controlled;
   gear means operably coupled to said output shaft for imparting rotary motion thereto, said gear means including first and second input shaft means,
   motor means for connection to a source of energy for operating said output shaft, said motor means including a rotatable output member;
   first coupling means for releasably engaging said first input shaft means in driving relationship with said output member of said motor means;
   means for manually operating said output shaft, said manual operating means including third shaft means, said third shaft means being movable both rotatably about and longitudinally along its axis;
   second coupling means for releasably engaging said second input shaft means in driving relationship with said third shaft means, said second coupling means including movable means disposed in an interference relationship with said third shaft means and movable therewith as said third shaft means moves along its axis; and
   lever means pivotally mounted and coupled between said first coupling means and said movable means of said second coupling means for controlling the releasable engagement of said first coupling means in accordance with longitudinal movement of said third shaft means.

4. Apparatus for actuating a valve having a movable valve stem, said apparatus comprising:
   a driving unit for connection to a source of power;
   a rotatable output shaft for connection to the movable valve stem;
   manually operable means for rotating said output shaft;
   coupling means for coupling said driving unit in driving engagement with said output shaft, said coupling means including a gear including means defining an axial bore and spline grooves in the axial bore,
   said output shaft extending through the axial bore and including a transverse bore therethrough communicating with said axial bore and said spline grooves, and said output shaft including an axial bore communicating with said transverse bore; and
   clutch means for disengaging said driving unit from said output shaft for manual operation of said valve, said clutch means including first means disposed in said transverse bore for movement along the axis thereof, second means disposed in the axial bore of said output shaft for movement along the axis thereof, said second means engaging said first means and operable to a first position to position said first means coincidentally in said transverse bore and said spline grooves to engage said driving unit with said output shaft and to a second position to position said first means in said transverse bore only to disengage said driving unit from said output shaft, and means for releasably latching said second means in said first position.

5. Apparatus according to claim 4, wherein said second means comprises a rotatably mounted elongate rod including a threaded portion, and said apparatus includes means for threadedly engaging said threaded portion to latch said rod.

6. Apparatus according to claim 5, wherein said elongate rod includes an axial bore, said axial bore of said output shaft has an end wall, and said elongate rod includes a second elongate rod within its axial bore and axially movable therein to extend one end thereof beyond said elongate rod as the other end thereof abuts said end wall when said elongtae rod is in said first position to provide a visual indication that said driving unit is engaged with said output shaft.

7. Apparatus according to claim 6, wherein said output shaft comprises said manually operable means integrally therewith, said manually operable means including means for receiving a hand-operated tool.

8. Apparatus for actuating a valve having a movable valve stem, said apparatus comprising:
   a driving unit for connection to a source of power;
   a rotatable output shaft for connection to the movable valve stem;
   coupling means connecting said driving unit in driving engagement with said output shaft, said coupling means comprising gear means operably interposed between said driving unit and said output shaft and including an intermediately located rotatable shaft;
   manually operable means for rotating said output shaft including a manually operable shaft movable rotatably about and longtiudinally along its axis and axially aligned with said intermediate shaft, a transverse pin carried by one of said aligned shafts, means forming grooves carried on the other of said aligned shafts for releasably engaging said transverse pin as said manually operable shaft is moved longitudinally along its axis for permitting manual operation of the valve, and means normally urging said manually operable shaft from engagement with said intermediate shaft; and
   clutch means connected to said coupling means for disengaging said driving unit from said output shaft for manual operation of the valve.

9. Apparatus according to claim 8, comprising a casing for housing said driving unit and said gear train, said output shaft extending through said casing,
   said manually operable means comprising a handle carried externally of said casing on said manually operable shaft and said manually operable shaft extending through said casing,
   said driving unit including a rotatable output member,
   said coupling means including a rotatable input member, and
   said clutch means comprises a transverse pin carried by one of said rotatable members, a clutch collar slidably carried by the other of said rotatable members including means forming grooves therein for receiving said transverse pin, and means for sliding said clutch collar to engage and disengage said transverse pin and said grooves including means for urging said collar toward said pin, and means linking said collar to said manually operable shaft.

10. Apparatus for actuating a valve having a movable stem manually or by motor comprising:
    a rotatable output shaft for connection to the movable valve stem,
    motor means for connection to a source of power, said motor means including a rotatable output member for connection in driving engagement with said rotatable output shafts,
    a manually rotatable shaft for connection in driving engagement with said rotatable output shaft, and
    means for selectively transferring engagement of said output member and said manual rotatable shaft with said output shaft, said transferring means including a gear train connected to said output shaft including a first portion and a second portion, and clutch means coupled to said output member and via said gear train to said manually rotatable shaft including first and second clutch portions,
    and wherein said valve actuating apparatus further comprises modular mounting means including a first module mounting said motor means, said first portion of said gear train and said first clutch portion, a second module mounting said manually rotatable shaft, said output shaft, said second portion of said gear train and said second clutch portion, and means for releasably connecting said first and second modules with their respective components in operative engagement including a pivotally mounted linkage coupling said first and second clutch portions.

References Cited
UNITED STATES PATENTS

| | | | |
|---|---|---|---|
| 847,115 | 3/1907 | Rucker | 192—93 |
| 2,619,847 | 12/1952 | Hosea | 74—625 |
| 2,621,543 | 12/1952 | Rossmann | 74—625 |
| 2,724,288 | 11/1955 | Benson | 74—625 |
| 2,772,578 | 12/1956 | Kling | 74—625 |
| 3,421,388 | 1/1969 | Carr | 74—625 |

FRED C. MATTERN, Jr., Primary Examiner
W. S. RATLIFF, Jr., Assistant Examiner

U.S. Cl. X.R.

192—93